United States Patent Office 3,306,927
Patented Feb. 28, 1967

3,306,927
N,N'-BIS(3 - AMINO - 5 - CARBOXY-2,4,6-TRIIODO-PHENYL)-LOWER-ALKANEDIOIC ACID AMIDES AND DERIVATIVES
Aubrey A. Larsen, Evansville, Ind., assignor to Sterling Drug Inc., New York, N.Y., a corporation of Delaware
No Drawing. Filed June 6, 1963, Ser. No. 285,865
14 Claims. (Cl. 260—471)

This invention relates to new iodinated organic acids and esters thereof, and to their preparation. More particularly, the invention comprises N,N'-bis(3-amino-5-carboxy-2,4,6-triiodophenyl)-lower alkanedioic acid amides and 3,3'-diamino-5,5'-dicarboxy-2,2',4,4',6,6'-hexaiodocarbanilides, and derivatives thereof.

The invention resides in the concept of a composition of matter wherein an N,N'-bis(5-carboxy-2,4,6-triiodophenyl)-lower-alkanedioic acid amide is substituted in the 3-positions of both phenyl rings by amino or lower-alkanoylamino groups; and to a composition of matter wherein a 5,5'-dicarboxy-2,2',4,4',6,6'-hexaiodocarbanilide is substituted in the 3- and 3'-positions by amino or lower-alkanoylamino groups.

The preferred aspects of the invention comprise compounds of the following structural formulas:

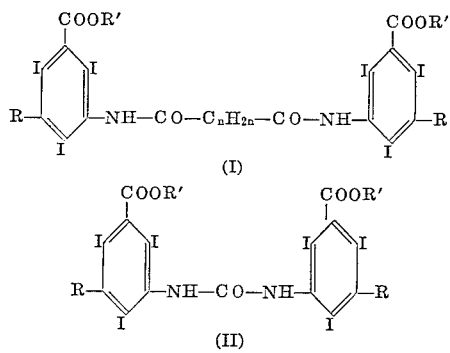

In the above formulas $n$ is an integer from 0 to 8, inclusive; R is amino, lower-alkanoylamino, lower-alkanoyl(loweralkyl)amino, or bis(lower-alkanoyl)amino; and R' is hydrogen, lower-alkyl or phenyl-lower-alkyl.

In the foregoing definitions the terms "lower-alkyl" and "lower-alkanoyl" refer to such groups having from one to about six carbon atoms. The carbon chains can be straight or branched. "Lower-alkyl" thus includes methyl, ethyl, propyl, isopropyl, butyl, isobutyl, pentyl, hexyl and the like; and "lower-alkanoyl" includes formyl, acetyl, propionyl, butyryl, isobutyryl, valeryl, caproyl and the like.

The compounds of the invention are prepared by two general methods:

(A) From 3-amino-5-nitrobenzoic acid

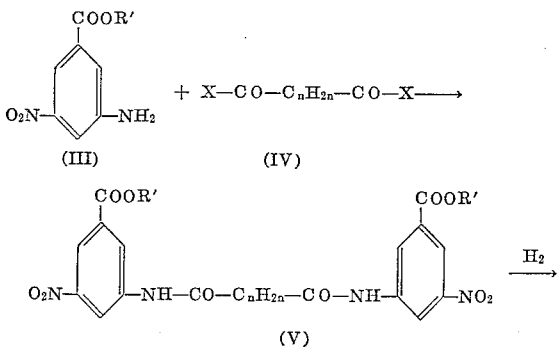

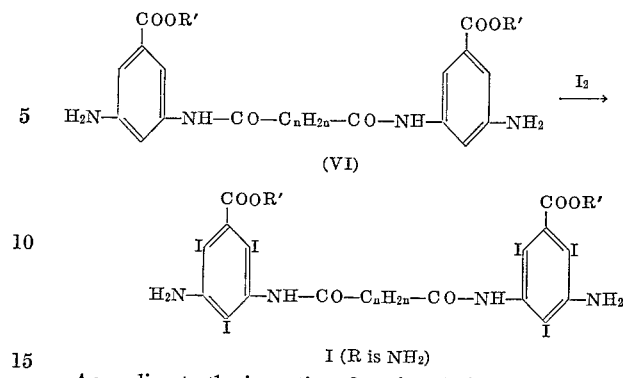

According to the invention, 3-amino-5-nitrobenzoic acid or an ester thereof (III) is caused to react with a lower-alkanedioic acid halide, X—CO—$C_nH_{2n}$—CO—X (IV), where X is middle halogen (chlorine or bromine), to yield an N,N' - bis(3-nitro-5-carboxyphenyl)alkanedioic acid amide (V); then the latter upon catalytic hydrogenation gives an N,N'-bis(3-amino-5-carboxyphenyl)alkanedioic acid amide (VI), which upon iodination gives a compound of Formula I where R is $NH_2$. The iodination can be carried out in acid medium by the addition of an iodinating agent, e.g., an excess of iodine monochloride or potassium iododichloride at room temperature.

The compounds of Formula II can be prepared by process A but substituting phosgene (Cl—CO—Cl) for the lower-alkanedioic acid halide (X—CO—$C_nH_{2n}$—CO—X).

In the event compounds of Formula I or II wherein R is lower-alkanoylamino or bis(lower-alkanoyl)amino are desired, they can be obtained from the corresponding compounds wherein R is amino by heating the latter with the apropriate acid halide or acid anhydride. The reaction is catalyzed by a trace of a strong acid such as sulfuric or perchloric acid. If moderate conditions are used, e.g., at a temperature about 100° C., the primary product is a compound where R is lower-alkanoylamino, only one hydrogen atom of each amino group being replaced by acyl. If higher temperatures are employed, 120° C. or higher, appreciable quantities of the compound where R is bis(lower-alkanoyl)amino are obtained, both hydrogen atoms of each amino group being replaced by acyl.

(B) From 3-amino-5-acylamino-2,4,6-triiodobenzoic acid

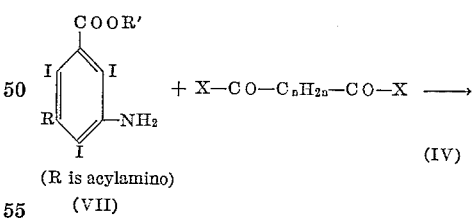

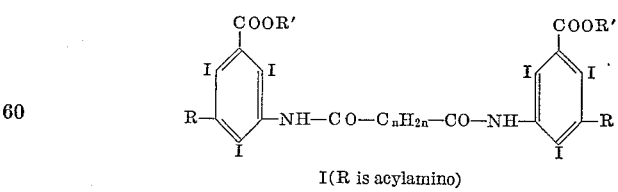

The starting materials for this process are known in the art and are prepared as described by Larsen et al., J. Am. Chem. Soc. 78, 3210–16 (1956), and in French Patent 820 M (Brevet Spécial de médicament). According to the present invention, a 3-amino-5-R-2,4,6-triiodobenzoic acid or an ester thereof [wherein R is lower-alkanoylamino, lower-alkanoyl(lower-alkyl)amino or bis(lower-alkanoyl)amino] (VII) is caused to react with a lower-alkanedioic acid halide, X—CO—$C_nH_{2n}$—CO—X (IV), where X is middle halogen (chlorine or bromine), to yield a compound of Formula I wherein R is lower-alkanoylamino, lower-alknoyl-(lower-alkyl)amino or bis(lower-alkanoyl)amino. The reaction is preferably carried out by heating the reactants in an inert solvent.

The compounds of Formula II can be prepared by process B but substituting phosgene (Cl—CO—Cl) for the lower-alkanedioic acid halide (X—CO—C$_n$H$_{2n}$—CO—X)

The structures of the compounds of the invention were established by the modes of synthesis, by elementary analysis, and by neutral equivalent determinations.

The acid compounds of Formulas I and II (R' is hydrogen), in the form of their water-soluble salts having pharmacologically acceptable cations, e.g., the sodium, calcium or N-methylglucamine salts, exhibit an especially low intravenous toxicity, and when injected into the blood stream of cats they were found to cause visualization of the gallbladder. The compounds are therefore useful as cholecystographic agents.

The ester compounds of Formulas I and II (R' is lower-alkyl or phenyl-lower-alkyl) are useful either as intermediates in the preparation of the acids (R' is hydrogen), or as radiopaque agents for visualization of body cavities by direct injection therein.

The following examples will further illustrate the invention without the latter being limited thereby.

EXAMPLE 1

(a) *N,N'-bis(3-nitro-5-carboxyphenyl)adipamide*

[V; n is 4, R' is H]

A solution of 20.5 g. of 3-nitro-5-aminobenzoic acid in 120 ml. of toluene was refluxed under a water trap to remove slight traces of water. Adipyl chloride (9.1 g.) was then added slowly, and the reaction mixture was heated at 100° C. for four hours. The solid product was collected by filtration, and washed with benzene, dilute hydrochloric acid and water. The solid product was suspended in hot ethanol, collected by filtration, suspended in saturated ammonium chloride solution, and ammonium hydroxide was added until the mixture was basic. The resulting diammonium salt was collected and recrystallized from 300 ml. of water using activated charcoal for decolorizing purposes, then dissolved in 2500 ml. of water and acidified with hydrochloric acid. There was thus obtained 18 g. of N,N'-bis(3-nitro-5-carboxyphenyl)adipamide, M.P. 299.5–301.6° C. (corr.).

By replacing the 3-nitro-5-aminobenzoic acid in the foregoing preparation by a molar equivalent amount of methyl 3-nitro-5-aminobenzoate or benzyl 3-nitro-5-aminobenzoate, there can be obtained, respectively, N,N'-bis(3-nitro-5-carbomethoxyphenyl)adipamide [V; n is 4, R' is CH$_3$] or N,N'-bis(3-nitro-5-carbobenzoxyphenyl)adipamide [V; n is 4, R' is CH$_2$C$_6$H$_5$].

By replacing the adipyl chloride in the foregoing preparation by a molar equivalent amount of oxalyl chloride, malonyl chloride, glutaryl chloride, β-methylglutaryl chloride, suberyl chloride or sebacyl chloride there can be obtained respectively, N,N'-bis(3-nitro-5-carboxyphenyl)oxamide [V; n is 0, R' is H], N,N'-bis(3-nitro-5-carboxyphenyl)malonamide [V; n is 1, R' is H], N,N'-bis(3-nitro-5-carboxyphenyl)glutaramide [V; n is 3, R' is H], N,N'-bis(3-nitro-5-carboxyphenyl)-β-methylglutaramide [V; C$_n$H$_{2n}$ is CH$_2$CH(CH$_3$)CH$_2$, R' is H], N,N'-bis(3-nitro-5-carboxyphenyl)suberamide [V; n is 6, R' is H], or N,N'-bis(3-nitro-5-carboxyphenyl)sebacamide [V; n is 8, R' is H].

[VI; n is 4, R' is H]

(b) *N,N'-bis(3-amino-5-carboxyphenyl)adipamide*

A suspension of 79.0 g. of N,N'-bis(3-nitro-5-carboxyphenyl)adipamide and 72.5 ml. of 100% hydrazine hydrate in 3 liters of water was prepared, and about 10 g. of Raney nickel catalyst was gradually added until frothing ceased. The reaction mixture was heated for one hour after the nickel had been added and then acidified with acetic acid. The product was collected by filtration to give 63.4 g. of N,N'-bis(3-amino-5-carboxyphenyl)adipamide, M.P. 310° C. (dec.) (uncorr.).

By replacing the N,N'-bis(3-nitro-5-carboxyphenyl)adipamide in the foregoing preparation by a molar equivalent amount of N,N'-bis(3-nitro-5-carbomethoxyphenyl)adipamide, N,N'-bis(3-nitro-5-carbobenzoxyphenyl)adipamide, N,N'-bis(3-nitro-5-carboxyphenyl)oxamide, N,N'-bis(3-nitro-5-carboxyphenyl)malonamide, N,N'-bis(3-nitro-5-carboxyphenyl)glutaramide, N,N'-bis(3-nitro-5-carboxyphenyl)-β-methylglutaramide, N,N'-bis(3-nitro-5-carboxyphenyl)suberamide, or N,N'-bis(3-nitro-5-carboxyphenyl)sebacamide there can be obtained, respectively N,N'-bis(3-amino-5-carbomethoxyphenyl)adipamide [VI; n is 4, R' is CH$_3$], N,N'-bis(3-amino-5-carbobenzoxyphenyl)adipamide [VI; n is 4, R' is CH$_2$C$_6$H$_5$], N,N'-bis(3-amino-5-carboxyphenyl)oxamide [VI; n is 0, R' is H], N,N'-bis(3-amino-5-carboxyphenyl)malonamide [VI; n is 1, R' is H], N,N'-bis(3-amino-5-carboxyphenyl)glutaramide [VI; n is 3, R' is H], N,N'-bis(3-amino-5-carboxyphenyl)-β-methylglutaramide [VI; C$_n$H$_{2n}$ is CH$_2$CH(CH$_3$)CH$_2$, R' is H], N,N'-bis(3-amino-5-carboxyphenyl)suberamide [VI; n is 6, R' is H], or N,N'-bis(3-amino-5-carboxyphenyl)sebacamide [VI; n is 8, R' is H].

(c) *N,N'-bis(3-amino-5-carboxy-2,4,6-triiodophenyl)adipamide*

[I; n is 4, R is NH$_2$, R' is H]

A mixture of 26.5 g. of N,N'-bis(3-amino-5-carboxyphenyl)adipamide and 192 ml. of 2 N aqueous potassium iododichloride solution in 800 ml. of distilled water was stirred for sixteen hours at room temperature. The solid product was collected by filtration, and the 65.3 g. of crude N,N'-bis(3-amino-5-carboxy-2,4,6-triiodophenyl)adipamide (M.P. above 300° C.) was converted to the diammonium salt by treating it with excess ammonium hydroxide, and regenerated by the addition of hydrochloric acid. The product was recrystallized from a dimethylformamide-ethanol mixture to give N,N'-bis(3-amino-5-carboxy-2,4,6-triiodophenyl)adipamide, M.P. above 300° C. (corr.).

The disodium salt of N,N'-bis(3-amino-5-carboxy-2,4,6-triiodophenyl)adipamide was prepared by adding 10% aqueous sodium hydroxide solution to a suspension of the free acid in water until the pH was 7.5–7.7. The disodium salt separated upon addition of isopropyl alcohol, and was recrystallized first from water by adding isopropyl alcohol and then from absolute methanol by adding ether. The disodium salt thus obtained had the M.P. 275.8–276.2° C. (dec.) (corr.).

By replacing the N,N'-bis(3-amino-5-carboxyphenyl)adipamide in the foregoing preparation by a molar equivalent amount of N,N'-bis(3-amino-5-carbomethoxyphenyl)adipamide, N,N'-bis(3-amino-5-carbobenzoxyphenyl)adipamide, N,N'-bis(3-amino-5-carboxyphenyl)oxamide, N,N'-bis(3-amino-5-carboxyphenyl)malonamide, N,N'-bis(3-amino-5-carboxyphenyl)glutaramide, N,N'-bis(3-amino-5-carboxyphenyl)-β-methylglutaramide, N,N'-bis(3-amino-5-carboxyphenyl)suberamide, or N,N'-bis(3-amino-5-carboxyphenyl)sebacamide there can be obtained, respectively, N,N'-bis(3-amino-5-carbomethoxy-2,4,6-triiodophenyl)adipamide [I; n is 4, R is NH$_2$, R' is CH$_3$], N,N'-bis(3-amino-5-carbobenzoxy-2,4,6-triiodophenyl)adipamide [I; n is 4, R is NH$_2$, R' is CH$_2$C$_6$H$_5$], N,N'-bis(3-amino-5-carboxy-2,4,6-triiodophenyloxamide [I; n is 0, R is NH$_2$, R' is H], N,N'-bis(3-amino-5-carboxy-2,4,6-triiodophenylmalonamide [I; n is 1, R is NH$_2$, R' is H], N,N'-bis(3-amino-5-carboxy-2,4,6-triiodophenyl)glutaramide [I; n is 3, R is NH$_2$, R' is H], N,N'-bis(3-amino-5-carboxy-2,4,6-triiodophenyl-β-methylglutaramide [I; C$_n$H$_{2n}$ is CH$_2$CH(CH$_3$)CH$_2$, R is NH$_2$, R' is H], N,N'-bis(3-amino-5-carboxy-2,4,6-triiodophenyl)suberamide [I;

$n$ is 6, R is $NH_2$, R' is H], or N,N'-bis(3-amino-5-carboxy-2,4,6-triiodophenyl)sebacamide [I; $n$ is 8, R is $NH_2$, R' is H].

EXAMPLE 2

*N,N'-bis(3-propionylamino-5-carboxy-2,4,6-triiodophenyl)adipamide*

[I; $n$ is 4, R is $CH_3CH_2CONH$, R' is H]

A mixture of 35.5 g. of N,N'-bis(3-amino-5-carboxy-2,4,6-triiodophenyl)adipamide, 130 ml. of propionic anhydride and 7 drops of concentrated sulfuric acid was heated on a steam bath for eight hours. The acid product was separated, purified through its diammonium salt and then converted to its disodium salt by the addition of methanolic sodium hydroxide to a solution of the acid in methanol. The addition of isopropyl alcohol caused separation of the disodium salt of N,N'-bis(3-propionylamino-5-carboxy - 2,4,6 - triiodophenyl)adipamide, M.P. 265.2–270.0° C. (corr.).

N,N'-bis(3-propionylamino-5-carboxy - 2,4,6 - triiodophenyl)adipamide was converted to its dimorpholine salt by adding the acid in portions to a solution of morpholine in methyl alcohol. Addition of ether caused separation of the dimorpholine salt, M.P. about 230° C. (uncorr.).

EXAMPLE 3

*N,N'-bis(3-butyrylamino-5-carboxy-2,4,6-triiodophenyl)adipamide*

[I; $n$ is 4, R is $CH_3CH_2CH_2CONH$, R' is H]

A mixture of 28.0 g. of N,N'-bis(3-amino-5-carboxy-2,4,6-triiodophenyl)adipamide, 210 ml. of butyric anhydride and 10 drops of sulfuric acid was heated on a steam bath for thirty hours. The product was converted to its diammonium salt with ammonium hydroxide and reconverted to the free acid with hydrochloric acid to give N,N'-bis(3-butyrylamino-5-carboxy-2,4,6 - triiodophenyl)adipamide, M.P. about 265° C. (dec.) (corr.); disodium salt, M.P. 275° C. (dec.) (uncorr.) when recrystallized from methanol by the addition of isopropyl alcohol.

By employing a higher temperature, 120–150° C., in the foregoing procedure there can be obtained, N,N'-bis(3-dibutyrylamino-5-carboxy-2,4,6-triiodophenyl)adipamide [I; $n$ is 4, R is $(CH_3CH_2CH_2CO)_2N$, R' is H].

N,N'-bis(3-butyrylamino-5-carboxy-2,4,6 - triiodophenyl)adipamide reacts with an equivalent amount of calcium hydroxide to form the calcium salt.

According to the procedures described above in Examples 2 and 3, N,N'-bis(3-amino-5-carboxy-2,4,6-triiodophenyl)adipamide can be caused to react with caproic anhydride, isobutyric anhydride or an acetic anhydride-formic acid mixture to give, respectively, N,N'-bis(3-caproylamino-5-carboxy-2,4,6 - triiodophenyl)adipamide [I; $n$ is 4, R is $CH_3(CH_2)_4CONH$, R' is H], N,N'-bis(3-isobutyrylamino-5-carboxy-2,4,6-triiodophenyl)adipamide [I; $n$ is 4, R is $(CH_3)_2CHCONH$, R' is H], or N,N'-bis(3-formylamino-5-carboxy-2,4,6-triiodophenyl)adipamide [I; $n$ is 4, R is HCONH, R' is H].

According to the procedures described above in Examples 2 and 3, N,N'-bis(3-amino-5-carbomethoxy-2,4,6-triiodophenyl)adipamide, N,N'-bis(3-amino - 5 - carbobenzoxy-2,4,6 - triiodophenyl)adipamide, N,N'-bis(3-amino-5-carboxy-2,4,6-triiodophenyl)oxamide, N,N' - bis(3-amino-5-carboxy - 2,4,6 - triiodophenyl)malonamide, N,N'-bis(3-amino-5-carboxy-2,4,6 - triiodophenyl)glutaramide, N,N'-bis(3-amino-5-carboxy - 2,4,6 - triiodophenyl)-β-methylglutaramide, N,N'-bis(3-amino - 5 - carboxy-2,4,6-triiodophenyl)suberamide, or N,N'-bis(3-amino-5-carboxy-2,4,6-triiodophenyl)sebacamide can be caused to react with acetic anhydride to give, respectively, N,N'-bis(3-acetylamino-5-carbomethoxy-2,4,6-triiodophenyl)adipamide [I; $n$ is 4, R is $CH_3CONH$, R' is $CH_3$], N,N'-bis(3-acetylamino-5-carbobenzoxy-2,4,6-triiodophenyl)adipamide [I; $n$ is 4, R is $CH_3CONH$, R' is $CH_2C_6H_5$], N,N'-bis(3-acetylamino-5-carboxy-2,4,6-triiodophenyl)oxamide [I; $n$ is 0, R is $CH_3CONH$, R' is H], N,N'-bis(3-acetylamino-5-carboxy-2,4,6-triiodophenyl)malonamide [I; $n$ is 1, R is $CH_3CONH$, R' is H], N,N'-bis(3-acetylamino-5-carboxy-2,4,6-triiodophenyl)glutaramide [I; $n$ is 3, R is $CH_3CONH$ R' is H], N,N'-bis(3-acetylamino-5-carboxy-2,4,6-triiodophenyl)-β-methylglutaramide [I; $C_nH_{2n}$ is $CH_2CH(CH_3)CH_2$ R is $CH_3CONH$, R' is H], N,N'-bis(3-acetylamino-5-carboxy-2,4,6-triiodophenyl)suberamide [I; $n$ is 6, R is $CH_3CONH$, R' is H], or N,N'-bis(3-acetylamino-5-carboxy-2,4,6-triiodophenyl)sebacamide [I; $n$ is 8, R is $CH_3CONH$, R' is H].

EXAMPLE 4

(a) *3,3'-dinitro-5,5'-dicarboxycarbanilide*.—A solution of 53.2 g. of 3-amino-5-nitrobenzoic acid in 750 ml. of chlorobenzene was prepared, and 50 ml. of 20% phosgene in toluene solution was added. The reaction mixture was stirred and heated at 100° C. for five hours. The solid product was collected by filtration, washed with toluene and n-hexane and dried. The product was purified by successively suspending it in hot ethanol and in hot water. There was thus obtained 3,3'-dinitro-5,5'-dicarboxycarbanilide, M.P. 303–307° C. (dec.) (uncorr.).

By replacing the 3-amino-5-nitrobenzoic acid in the foregoing preparation by a molar equivalent amount of methyl 3-amino-5-nitrobenzoate or benzyl 3-amino-5-nitrobenzoate there can be obtained, respectively, 3,3'-dinitro-5,5'-dicarbomethoxycarbanilide or 3,3'-dinitro-5,5'-dicarbobenzoxycarbanilide.

(b) *3,3'-diamino-5,5'-dicarboxycarbanilide* was prepared from 70.0 g. of 3,3'-dinitro-5,5'-dicarboxycarbanilide, and 78 ml. of 100% hydrazine hydrate in 2000 ml. of water in the presence of Raney nickel catalyst according to the procedure described above in Example 1, part (b). The product was purified by converting it to the disodium salt with an excess of 10% sodium hydroxide solution, decolorizing the solution and reprecipitating the acid with 6 N hydrochloric acid. The acidified product was collected by filtration to give 3,3'-diamino-5,5'-dicarboxycarbanilide in the form of its monohydrochloride salt, M.P. above 300° C.

By replacing the 3,3'-dinitro-5,5'-dicarboxycarbanilide by a molar equivalent amount of 3,3'-dinitro-5,5'-dicarbomethoxycarbanilide or 3,3'-dinitro-5,5'-dicarbobenzoxycarbanilide there can be obtained, respectively, 3,3'-diamino-5,5'-dicarbomethoxycarbanilide or 3,3'-diamino-5,5'-dicarbobenzoxycarbanilide.

(c) *3,3'-diamino-5,5'-dicarboxy-2,2',4,4',6,6'-hexaiodocarbanilide*

[II; R is $NH_2$, R' is H].

A mixture of 47.6 g. of 3,3'-diamino-5,5'-dicarboxycarbanilide, 390 ml. of 2 N aqueous potassium iododichloride solution and 3900 ml. of water was stirred for six hours at room temperature. An additional 78 ml. of potassium iododichloride solution was then added and the mixture stirred for eighteen hours longer. The solid product was collected, washed with cold water and suspended in 200 ml. of saturated ammonium chloride solution. Concentrated ammonimum hydroxide (20 ml.) was added and the mixture stirred and warmed for thirty minutes. The diammonium salt which had separated was collected, washed with ammonium chloride solution and dissolved in 200 ml. of methanol and 500 ml. of water. The solution was decolorized with a small amount of sodium thiosulfate and with activated charcoal and filtered. The filtrate was made acid with acetic acid and the free acid product was dissolved in 450 ml. of dimethylformamide and decolorized repeatedly with activated charcoal. Upon the addition of 300–350 ml. of boiling absolute ethanol the product separated, and it was collected and further purified by repeated suspension in boiling ethanol. There was thus obtained 3,3'-diamino-5,5'-dicarboxy-2,2',4,4',6,6'-hexaiodocarbanilide, M.P. above 300° C. (corr.).

By replacing the 3,3'-diamino-5,5'-dicarboxycarbanilide in the foregoing preparation by a molar equivalent amount of 3,3'-diamino-5,5'-dicarbomethoxycarbanilide or 3,3'-diamino-5,5'-dicarbobenzoxycarbanilide there can be obtained, respectively, 3,3'-diamino-5,5'-dicarbomethoxy-2,2',4,4',6,6'-hexaiodocarbanilide [II; R is $NH_2$, R' is $CH_3$] or 3,3'-diamino-5,5'-dicarbobenzoxy-2,2',4,4',6,6'-hexaiodocarbanilide [II; R is $NH_2$, R' is $CH_2C_6H_5$].

EXAMPLE 5

*3,3'-diacetylamino-5,5'-dicarboxy-2,2',4,4',6,6'-hexaiodocarbanilide*

[II; R is $CH_3CONH$, R' is H].

A mixture of 7.2 g. of 3,3'-diamino-5,5'-dicarboxy-2,2',4,4',6,6'-hexaiodocarbanilide, 35 ml. of acetic anhydride and 2 drops of concentrated sulfuric acid was stirred and heated on a steam bath for three hours. The reaction mixture was cooled, and the solid product was collected by filtration and purified by suspending it in 200 ml. of boiling methanol. The product was finally washed with acetone and ether and dried to give 7.0 g. of 3,3'-diacetylamino - 5,5' - dicarboxy-2,2',4,4',6,6'-hexaiodocarbanilide, M.P. above 300° C. (corr.).

By replacing the 3,3'-diamino-5,5'-dicarboxy-2,2',4,4',6,6'-hexaiodocarbanilide in the foregoing preparation by a molar equivalent amount of 3,3'-diamino-5,5'-dicarbomethoxy-2,2',4,4'-6,6'-hexaiodocarbanilide or 3,3'-diamino-5,5'-dicarbobenzoxy-2,2',4,4',6,6'-hexaiodocarbanilide there can be obtained, respectively, 3,3'-diacetylamino-5,5' - dicarbomethoxy - 2,2',4,4',6,6' - hexaiodocarbanilide [II; R is $CH_3CONH$, R' is $CH_3$] or 3,3'-diacetylamino-5,5' - dicarbobenzoxy - 2,2',4,4',6,6' - hexaiodocarbanilide [II; R is $CH_3CONH$, R' is $CH_3$].

EXAMPLE 6

*3,3'-dipropionylamino-5,5'-dicarboxy-2,2',4,4',6,6'-hexaiodocarbanilide* [II; R is $CH_3CH_2CONH$, R' is H] was prepared from 10.8 g. of 3,3'-diamino-5,5'-dicarboxy-2,2',4,4',6,6'-hexaiodocarbanilide, 50 ml. of propionic anhydride and 10 drops of concentrated sulfuric acid. The reaction mixture was heated on a steam bath for seventeen hours, and the product was purified through the diammonium salt to give 7.2 g. of 3,3'-dipropionylamino-5,5'-dicarboxy-2,2',4,4',6,6'-hexaiodocarbanilide, M.P. above 300° C. (uncorr.).

3,3'-dipropionylamino-5,5'-dicarboxy-2,2',4,4',6,6'-hexaiodocarbanilide (7.1 g.) and 2.34 g. of N-methylglucamine were ground together in a mortar and then suspended in 300 ml. of hot methanol. Distilled water (150 ml.) was added and the solution was filtered and concentrated to dryness. The residue was suspended in boiling ethanol and the solid product collected by filtration. There was thus obtained 8.6 g. of 3,3'-dipropionylamino-5,5'-dicarboxy-2,2',4,4',6,6'-hexaiodocarbanilide in the form of its di-N-methylglucamine salt, M.P. 187.2–188.0° C. (dec.) (corr.).

EXAMPLE 7

*3,3' - dibutyrylamino-5,5'-dicarboxy-2,2',4,4',6,6'-hexaiodocarbanilide* [II; R is $CH_3CH_2CH_2CONH$, R' is H] was prepared from 10.8 g. of 3,3'-diamino-5,5'-dicarboxy-2,2',4,4',6,6'-hexaiodocarbanilide, 50 ml. of n-butyric anhydride and 10 drops of concentrated sulfuric acid by the procedure described above in Examples 5 and 6. There was thus obtained 9.3 g. of 3,3'-dibutrylamino-5,5'-dicarboxy-2,2',4,4',6,6'-hexaiodocarbanilide, M.P. about 260° C. (dec.) (uncorr.); di-N-methyl-glucamine salt, M.P. 200.4–201° C. (dec.) (corr.).

EXAMPLE 8

*3,3' - divalerylamino-5,5'-dicarboxy-2,2',4,4',6,6'-hexaiodocarbanilide* [II; R is $CH_3(CH_2)_3CONH$, R' is H] was prepared from 14.2 g. of 3,3'-diamino-5,5'-dicarboxy-2,2',4,4',6,6'-hexaiodocarbanilide, 53 ml. of n-valeric anhydride and 10 drops of concentrated sulfuric acid according to the procedures described above in Examples 5 and 6. There was thus obtained 9.4 g. of 3,3'-divalerylamino-5,5'-dicarboxy - 2,2',4,4',6,6' - hexaiodocarbanilide, M.P. 245–247° C. (dec.) (uncorr.); di-N-methylglucamine salt, M.P. 188–190° C. (dec.) (uncorr.)

According to the foregoing procedures 3,3'-diamino-5,5'-dicarboxy-2,2',4,4',6,6'-hexaiodocarbanilide can be caused to react with n-caproic anhydride, isovaleric anhydride, or an acetic anhydride-formic acid mixture to give, respectively, 3,3'-dicaproylamino - 5,5' - dicarboxy-2,2',4,4',6,6'-hexaiodocarbanilide [II; R is $CH_3(CH_2)_4CONH$ R' is H], 3,3'-diisovalerylamino-5,5'-dicarboxy-2,2',4,4',6,6'-hexaiodocarbanilide [II; R is $(CH_3)_2CHCONH$, R' is H], or 3,3'-diformylamino-5,5'-dicarboxy-2,2',4,4',6,6'-hexaiodocarbanilide [II; R is $HCONH$, R' is H].

EXAMPLE 9

*3,3'-bis(dipropionylamino)-5,5'-dicarboxy-2,2',4,4',6,6'-hexaiodocarbanilide*

[II; R is $(CH_3CH_2CO)_2N$, R' is H]

A mixture of 13.5 g. of 3,3'-diamino-5,5'-dicarboxy-2,2',4,4',6,6'-hexaiodocarbanilide, 124 ml. of propionic anhydride and 4 drops of concentrated sulfuric acid was heated at 120–130° C. for three hours. The reaction mixture was cooled, and the solid product was collected and purified through its ammonium salt and by suspension in boiling methanol. There was thus obtained 3,3'-bis(dipropionylamino) - 5,5'-dicarboxy-2,2',4,4',6,6'-hexaiodocarbanilide, M.P. above 300° C. (corr.).

EXAMPLE 10

(a) *Benzyl 3-acetylamino-5-amino-2,4,6-triiodobenzoate*

A mixture of 22.8 g. of 3-acetylamino-5-amino-2,4,6-triiodobenzoic acid, 6.5 g. (5.9 ml.) of benzyl chloride and 2.3 g. of anhydrous sodium carbonate in 100 ml. of dimethylformamide was heated on a steam bath for twenty hours. The reaction mixture was poured into 600 ml. of cold water, and the solid product was collected by filtration, washed with cold water and dried to give 23.5 g. of benzyl 3-acetylamino-5-amino-2,4,6-triiodobenzoate, M.P. 198–200° C. (uncorr.) when recrystallized from 100 ml. of chlorobenzene.

(b) *N,N'-bis(3-acetylamino-5-carbobenzoxy-2,4,6-triiodophenyl)adipamide*

[I, n is 4, R is $CH_3CONH$, R' is $CH_2C_6H_5$]

Adipic acid chloride (1.5 g.) was added dropwise to a solution of 16.1 g. of benzyl 3-acetylamino-5-amino-2,4,6-triiodobenzoate in 50 ml. of chlorobenzene at 120° C. The reaction mixture was stirred and heated for two hours, and the solid product was collected by filtration, triturated with ether, repeatedly suspended in boiling acetone and collected to give 8.6 g. of N,N'-bis(3-acetylamino-5-carbobenzoxy - 2,4,6 - triiodophenyl)adipamide, M.P. 268–269° C. (dec.) (uncorr.).

(c) *N,N'-bis(3-acetylamino-5-carboxy-2,4,6-triiodophenyl)adipamide*

[I; n is 4, R is $CH_3CONH$, R' is H]

A mixture of 11.26 g. of N,N'-bis(3-acetylamino-5-carbobenzoxy-2,4,6-triiodophenyl)adipamide and 100 ml. of 30% hydrogen bromide in acetic acid was allowed to stand at room temperature for several days. The reaction mixture was poured into ice water, the mixture allowed to warm to room temperature, and the solid product was collected by filtration and washed with cold water. The product was suspended in water, a slight excess of ammonium hydroxide was added and the solution of diammonium salt extracted with ether to remove benzyl bromide. The aqueous solution was decolorized with activated charcoal, filtered and made acid with hydrochloric acid. The free acid, N,N'-bis(3-acetylamino-5-carboxy-2,4,6-triiodophenyl)adipamide, was collected by filtration.

A solution of 5.7 g. of N,N'-bis(3-acetylamino-5-carboxy-2,4,6-triiodophenyl)adipamide in 100 ml. of anhydrous methanol was added to a solution of 1.95 g. of N-methylglucamine in 100 ml. of methanol. The supernatant liquid was decanted from the gum which had separated, and the gum was triturated with acetone to give 5.1 g. of N,N'-bis(3-acetylamino-5-carboxy-2,4,6-triiodophenyl)adipamide in the form of its di-N-methylglucamine salt, M.P. 185.2° C. (corr.).

To a suspension of 33.23 g. of N,N'-bis(3-acetylamino-5-carboxy-2,4,6-triiodophenyl)adipamide in 37 ml. of methanol was added 27.08 ml. of 1.93 N sodium hydroxide in methanol. The mixture was filtered, the filtrate poured into 700 ml. of isopropyl alcohol with stirring, and the solid product was separated and collected to give N,N'-bis(3-acetylamino-5-carboxy - 2,4,6 - triiodophenyl)adipamide in the form of its disodium salt, M.P. 264.2–270.0° C. (dec.) (corr.).

EXAMPLE 11

*3,3'-diacetylamino-5,5'-dicarbobenzoxy-2,2',4,4',6,6'-hexaiodocarbanilide*

[II; R is CH₃CONH, R' is CH₂C₆H₅]

To a boiling solution of 33.0 g. of benzyl 3-acetylamino-5-amino-2,4,6-triiodobenzoate in 125 ml. of chlorobenzene was added 8.5 ml. (1.7 g.) of a 20% solution of phosgene in toluene. The reaction mixture was refluxed for ninety minutes and the solid product was collected and washed with hot chlorobenzene. To the filtrate was added 8.0 ml. of 20% phosgene in toluene and the mixture was refluxed for ninety minutes. The procedure was repeated a third time and the solid products were combined to give 3,3'-diacetylamino-5,5'-dicarbobenzoxy-2,2',4,4',6,6'-hexaiodocarbanilide, M.P. 263.2° C. (dec.) (corr.).

3,3'-diacetylamino - 5,5' - dicarbobenzoxy-2,2',4,4',6,6'-hexaiodocarbanilide can be hydrolyzed with hydrogen bromide in acetic acid according to the procedure described above in Example 10, part (c) to give 3,3'-diacetylamino-5,5'-dicarboxy-2,2',4,4',6,6'-hexaiodocarbanilide, identical with the compound prepared above in Example 5.

According to the procedures described above in Examples 10 and 11, 3-acetyl-(N-methyl)amino-5-amino-2,4,6-triiodobenzoic acid can be caused to react with adipyl chloride or with phosgene to give, respectively, N,N'-bis-[3 - acetyl - (N-methyl)amino - 5 - carboxy-2,4,6-triiodophenyl]adipamide [I; n is 4, R is CH₃CO(CH₃)N, R' is H] or 3,3'-bis[acetyl-(N-methyl)amino]-5,5'-dicarboxy-2,2',4,4',6,6'-hexaiodocarbanilide [II; R is CH₃CO(CH₃)N R' is H].

I claim:
1. An N,N'-bis(3-lower - alkanoylamino - 5 - carboxy-2,4,6-triiodophenyl)-lower-alkanedioic acid amide.
2. An N,N'-bis(3-amino-5-carboxy-2,4,6-triiodophenyl)-lower-alkanedioic acid amide.
3. A compound of the formula

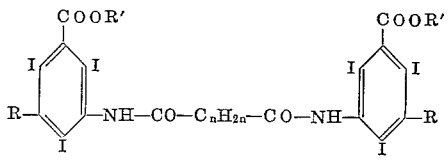

wherein n is an integer from 0 to 8, inclusive; R is a member of the group consisting of amino, lower-alkanoylamino, lower-alkanoyl(lower-alkyl)amino and bis(lower-alkanoyl)amino; and R' is a member of the group consisting of hydrogen, lower-alkyl and phenyl-lower-alkyl.

4. A compound of the formula

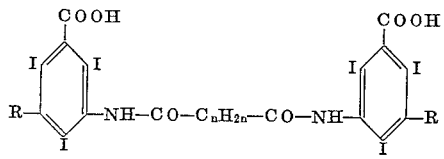

wherein n is an integer from 0 to 8, inclusive; and R is lower-alkanoylamino.

5. A compound of the formula

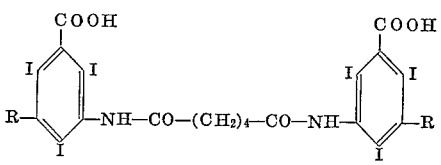

wherein R is lower-alkanoylamino.

6. N,N'-bis(3-amino-5-carboxy - 2,4,6 - triiodophenyl)-adipamide.
7. N,N'-bis(3-acetylamino-5-carboxy-2,4,6-triiodophenyl)adipamide.
8. N,N'-bis(3-propionylamino-5-carboxy - 2,4,6-triiodophenyl)adipamide.
9. N,N' - bis(3 - butyrylamino-5-carboxy-2,4,6 - triiodophenyl)adipamide.
10. N,N'-bis[3-acetyl - (N-methyl)amino - 5 - carboxy-2,4,6-triiodophenyl]adipamide.
11. A compound of the formula

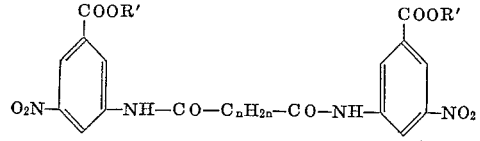

wherein n is an integer from 0 to 8, inclusive; and R' is a member of the group consisting of hydrogen, lower-alkyl and phenyl-lower-alkyl.

12. N,N'-bis(3-nitro-5-carboxyphenyl)adipamide.
13. A compound of the formula

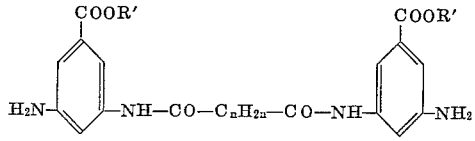

wherein n is an integer from 0 to 8, inclusive; and R' is a member of the group consisting of hydrogen, lower-alkyl and phenyl-lower-alkyl.

14. N,N'-bis(3-amino-5-carboxyphenyl)adipamide.

References Cited by the Examiner

UNITED STATES PATENTS 2,776,241 1/1957 Priewe et al. _____ 260—471
3,178,473 4/1965 Holtermann et al. ____ 260—471

FOREIGN PATENTS 576,507 5/1959 Canada.

LORRAINE A. WEINBERGER, *Primary Examiner.*
DANIEL D. HORWITZ, *Examiner.*
V. GARNER, *Assistant Examiner.*